May 16, 1961 J. A. MATHEWS 2,984,318
LATCHING MEANS FOR POSITIVELY RESTRAINING PARKED
TRUCKS AND OTHER VEHICLES AGAINST MOVEMENT
Filed Dec. 5, 1958
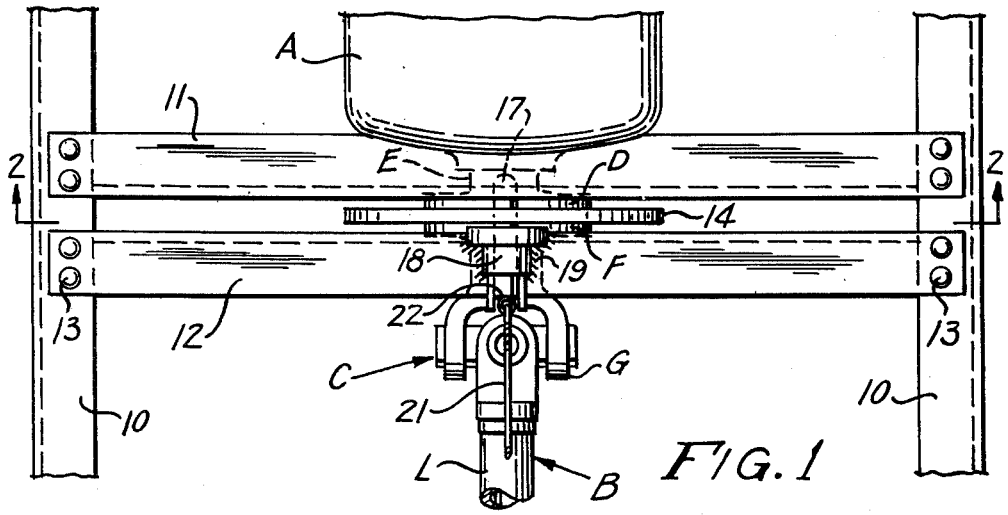
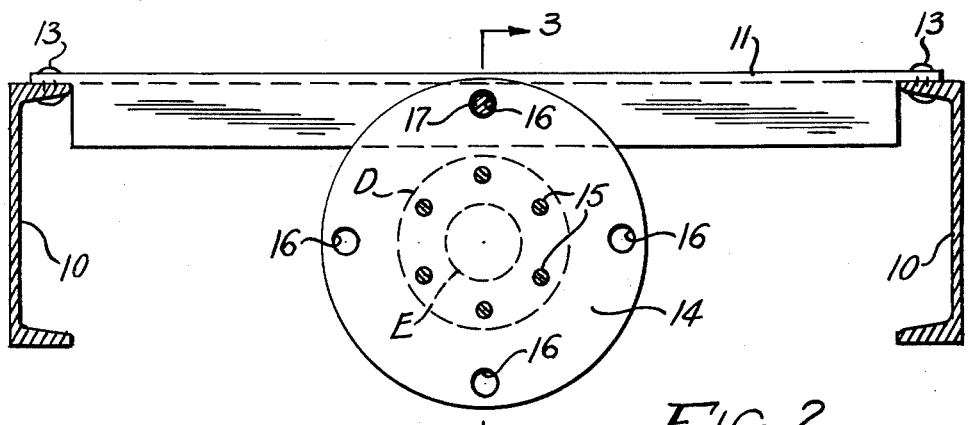
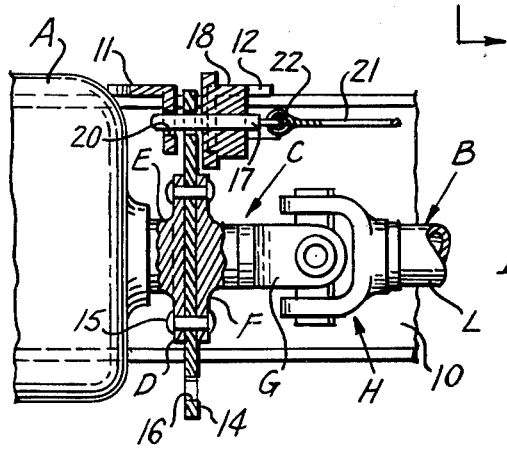
INVENTOR.
JAMES A. MATHEWS
BY
Atty.

2,984,318

LATCHING MEANS FOR POSITIVELY RESTRAINING PARKED TRUCKS AND OTHER VEHICLES AGAINST MOVEMENT

James A. Mathews, R.R. 3, Box 92, Michigan City, Ind.

Filed Dec. 5, 1958, Ser. No. 778,402

1 Claim. (Cl. 188—31)

The present invention relates to improvements in restraining devices or mechanism for parked trucks and other vehicles.

The principal object of the present invention is to provide latch means directly associated with the drive-line of a truck or automobile transmission, with a view toward positively securing the drive-line against rotation, thus securing the driven wheels of the vehicle against movement.

Another important object of the invention is to provide detent means for the drive shafts of automobiles, which can be set to prevent movement of an automobile, unintentionally when parked, and in complement, a lock may be used with this detent means to positively secure the drive shaft against rotation in the event of an unauthorized attempt to use the vehicle.

A further object of the invention is to provide a detent, in the form of a latch for automobile, trucks and commercial vehicle drive lines, which is not only positive acting and substantially foolproof, but which is also of simple construction and capable of being manufactured and installed at a nominal monetary figure.

These and various other objects and advantages of the invention will become apparent to the reader of the following description.

In the drawings:

Figure 1 is a fragmentary top plan view of the restraining device installed in conjunction with an automobile or truck transmission.

Figure 2 is a vertical section taken substantially on line 2—2 of Figure 1.

Figure 3 is a vertical fragmentary sectional view taken on line 3—3 of Figure 2.

Referring to the drawings wherein like numerals designate like parts, it can be seen that numerals 10, 10 denote the side beams of an automobile or truck chassis.

In carrying out the present invention, a pair of angle-struts 11, 12, bridge these beams 10, 10 and are secured to said beams by rivets or the like 13. These beams have their downturned flanges in opposed parallel spaced relation, as shown in Figure 3.

The conventional parts of the structure with which the present invention is associated, is represented by a conventional transmission A, from which a drive line generally referred to by numeral B extends to the usual rear wheels (not shown) of an automobile or truck.

There is the usual coupling, generally referred to by numeral C, this including a flange D on the drive section E of the drive line B and a flange F on a bifurcated element G of an universal joint generally referred to by numeral H, which is in connection with the usual driven section L of the drive line B.

Between the flanges D and F, is installed a disc 14, which is bolted or riveted in place by elements 15.

The disc 14 operates at its peripheral portion, between the opposed flanges of the struts 11, 12.

This disc 14 has a plurality of peripheral openings 16 therein, for receiving a latch bolt 17.

The strut 12 has a guide body 18 welded or otherwise secured, as at 19 to the horizontal flange of the strut and this body 18 has an opening formed therethrough, for receiving the bolt 17.

The strut 12 is also formed with an opening, registering with the opening through the body 18 and directly opposite, the depending flange of the strut 11 is also formed with an opening 20, for receiving the bolt 17, when it has been disposed through the body 18, one of the openings 16 and accommodated by the opening 20 of the strut 11.

A control cable 21, which may operate through a compact tube or flexible sheath, is connected in any suitable manner, as indicated by numeral 22, to the bolt 17.

It can be seen, that when a vehicle, thus equipped is parked in the usual manner, the operator will actuate the cable so as to present the bolt to the proper position. If parked on a down hill grade, the vehicle will be backed up a short distance in order to release the bolt from the disc. If the vehicle is parked otherwise, the vehicle will be slightly moved forward to release the bolt, because of the contact and binding action of the bolt against the disc.

Thus it can be seen, that the restraining means will positively hold a vehicle and not depend upon the ratchet and pawl means that now holds the usual emergency brake, which in many instances becomes defective over a period of time.

While the foregoing description sets forth the invention in specific terms, it is to be understood that numerous changes in the shape, size and materials may be resorted to without departing from the spirit and scope of the invention as claimed hereinafter.

Having described the invention, what is claimed as new is:

In combination with the drive line of a truck or automobile having side beams, wherein the drive line is divided into drive and driven sections, each of said sections having a circular flange thereon, each of said flanges having a circular row of spaced openings therein, a plate having an inner circular row of openings therein that are adapted to be aligned with the openings in said flange, said plate being interposed between the flanges on said sections and securing means extending through the aligned openings so that said plate is rotatable as a unit with said drive and driven sections, said plate having an outer circular row of openings therein, a pair of parallel members mounted on and in spaced relation transversely between said side beams and having dependent flanges between which said plate rotates, said parallel members having aligned openings being in selective alignment with at least one of the outer openings in said plate, a latch means adapted to extend through the openings in said parallel members and said plate when in selectively aligned position, and a cable control secured to said latch means to actuate said latch means.

References Cited in the file of this patent

UNITED STATES PATENTS

| | | |
|---|---|---|
| 1,332,966 | Werner | Mar. 9, 1920 |
| 2,048,946 | Phillips | July 28, 1936 |
| 2,100,970 | MacMullen | Nov. 30, 1937 |
| 2,537,514 | Curtiss | Jan. 9, 1951 |
| 2,672,203 | Brown | Mar. 16, 1954 |
| 2,679,302 | Watson et al. | May 25, 1954 |